US006375332B1

(12) United States Patent
Whinney

(10) Patent No.: US 6,375,332 B1
(45) Date of Patent: Apr. 23, 2002

(54) DECORATIVE MIRROR UNIT

(76) Inventor: Ian Philip Whinney, 89 Playford Road, Rushmere St. Andrew, Ipswich Suffolk IP4 5RQ (GB)

( * ) Notice: Subject to any disclaimer, the term of this patent is extended or adjusted under 35 U.S.C. 154(b) by 0 days.

(21) Appl. No.: 09/554,851

(22) PCT Filed: Nov. 17, 1998

(86) PCT No.: PCT/GB98/03409

§ 371 Date: May 19, 2000

§ 102(e) Date: May 18, 2000

(87) PCT Pub. No.: WO99/25569

PCT Pub. Date: May 19, 1999

(30) Foreign Application Priority Data

Nov. 18, 1997 (GB) .................................................. 97245

(51) Int. Cl.[7] .................................................. G02B 5/08

(52) U.S. Cl. .................... 359/838; 359/839; 428/912.2; 52/785.1

(58) Field of Search ................................ 359/838, 839, 359/840, 857, 861, 883; 428/13, 38, 46, 912.2, 913.3; 52/786.11, 785.1

(56) References Cited

U.S. PATENT DOCUMENTS

| | | | | | |
|---|---|---|---|---|---|
| 4,304,447 | A | | 12/1981 | Ellwood et al. | 312/204 |
| 4,488,919 | A | * | 12/1984 | Butler | 156/153 |
| 4,546,019 | A | | 10/1985 | Schneider | 428/13 |
| 4,559,732 | A | | 12/1985 | Levy et al. | 40/595 |
| 5,137,761 | A | | 8/1992 | Altmayer | 428/428 |
| 5,139,828 | A | * | 8/1992 | Altmayer | 428/13 |
| 5,367,801 | A | | 11/1994 | Ahn | 40/152 |
| 5,452,139 | A | | 9/1995 | Schrott | 359/871 |
| 5,477,653 | A | | 12/1995 | Altmayer | 52/311.1 |
| 5,494,715 | A | * | 2/1996 | Glover | 428/34 |
| 5,783,264 | A | * | 7/1998 | Howes | 428/13 |
| 5,853,852 | A | * | 12/1998 | Eichhorn | 428/167 |

FOREIGN PATENT DOCUMENTS

| | | |
|---|---|---|
| DE | 42 32 458 C1 | 9/1994 |
| EP | 0 458 075 A1 | 11/1991 |
| FR | 964.063 | 1/1950 |
| GB | 561812 | 12/1942 |
| GB | 598336 | 2/1948 |
| GB | 688390 | 3/1953 |
| GB | 913995 | 12/1962 |
| GB | 1 208 891 | 10/1970 |
| GB | 1 483 226 | 8/1977 |
| GB | 2 031 288 | 4/1980 |
| GB | 2 331 240 | 5/1999 |
| JP | 9 138 647 | 11/1995 |
| WO | WO 86/07271 | 12/1986 |

* cited by examiner

*Primary Examiner*—Mark A. Robinson
(74) *Attorney, Agent, or Firm*—Kirton & McConkie; Michael F. Krieger

(57) ABSTRACT

This invention relates to a decorative mirror unit and to a method of fabricating the decorative mirror unit. A decorative mirror unit comprises a mirror and at least one sheet of glass spaced in front of the mirror by spacer means, and a plurality of decorative elements applied to the glass by an adhesive means, characterized in that at least one decorative element has been applied to each surface on opposite sides of the glass by said adhesive means, said decorative elements on opposite sides of the glass aligning to conceal at least partially the adhesive means between at least one of the decorative elements and the glass.

14 Claims, 3 Drawing Sheets

DECORATIVE MIRROR UNIT

BACKGROUND a. Field of the Invention

This invention relates to a decorative mirror unit and to a method of fabricating the decorative mirror unit.

b. Related Art

Compared with plain mirrors, decorative mirror units are relatively uncommon. One type of decorative mirror unit that has been known for many years employs two parallel sheets of mirrored float glass spaced apart in a frame. The inner, or rear mirror is fully reflecting, and the outer, or front mirror is partially reflecting, so that the viewer sees multiple superimposed images, for example of himself, fading off to infinity.

A more recent variant of this type of mirror is disclosed in patent document U.S. Pat. No. 5,137,761, in which a third sheet of clear glass is held parallel between the two mirrors. The clear glass has clear, coloured or reflective glass stones adhered to one surface of the glass, with a clear u-v curable adhesive. The glass stones can create interesting optical effects by splitting up light incident on the stones, both as viewed directly, and in the multiple images seen in the rear mirror.

A simpler version of a decorative mirror unit is disclosed in U.S. Pat. No. 5,139,828. This unit has one fully reflecting mirror in front of which is spaced in parallel one sheet of clear glass to which cut glass stones have been adhered with a clear u-v curable glue. The stones may be lit from the sides, again to provide interesting optical effects owing to scattering and diffraction of light from the stones.

In both cases, the glass stones are provided only on an internal surface of the unit so that they are protected from dirt, which would otherwise interfere with the optical effects.

An important feature of these prior art decorative units incorporating glass stone decorative elements is that the u-v adhesive is transparent so that it does not interfere with the optical effects. Glass stones can be provided with a very flat side to be affixed to the flat float glass so as to mimimise the amount of adhesive to be used. But it can be difficult to apply the transparent u-v adhesive in such a way that no bubbles are trapped whilst at the same time minimising any excess of adhesive pressed out around the edges into an unsightly bead around the decorative glass.

Whilst such decorative mirrors provide interesting optical effects, they effectively are limited in the type of decorative elements that may be applied, i.e. being limited to clear, coloured or reflective glass stones adhered on an inner protected surface of the unit with an optically clear adhesive.

SUMMARY OF THE INVENTION

It is an object of the present invention to provide a decorative mirror unit that addresses such limitations.

Accordingly, the invention provides a decorative mirror unit, comprising a mirror and at least one sheet of glass spaced in front of the mirror by spacer means, and a plurality of decorative elements applied to the glass by an adhesive means, characterized in that said sheet of glass has a pair of opposite plane-parallel surfaces and at least one optically non-transparent decorative element has been applied to each surface on opposite sides of the glass by said adhesive means, said decorative elements on opposite sides of the glass aligning to conceal at least partially the adhesive means between at least one of the decorative elements and the glass, wherein said plane-parallel surfaces extend away from a pair of said aligned optically non-transparent decorative elements on opposite sides of the glass so that a viewer can see one of said pair of decorative elements directly, and at the same time view through the plane-parallel surfaces a virtual image in the mirror of the other of said pair of decorative elements.

The glass will normally be a single unbroken sheet of glass, usually clear float glass. The decorative elements may be any type of decorative element that can be applied to glass. One type of decorative element is a strip of lead-alloy. These strips may have for convenience a self-adhesive backing. Areas between the strips, or between the strips and the edges of the window can be coloured by affixing a conveniently self-adhesive coloured plastic film, which can be transparent or translucent. The coloured film may be affixed first, so that the strips may be applied to cover the edges of the film, or the coloured film may be affixed on the opposite side to the strips, which then act as a template to guide placement of the film. Other type of decorative elements may also be applied, such as moulded, beveled or cut glass fixed in place, for example, by u-v curable glue. All such suitable items that may be affixed to a sheet of glass are referred to herein as “decorative elements”.

The adhesive means may be a bond between the decorative element and the glass, for example when the decorative element is a paint or resin applied to the glass. In this case the decorative elements conceal at least partially an adhesive interface between the decorative element and the glass. This is particularly effective when the resin is applied as a bead to the glass, the bead having a convex outer surface and a flat adhesive interface. The flat adhesive interface can then be concealed by another similar bead applied to the opposite surface of the glass.

Alternatively, the adhesive means may comprise an adhesive layer between at least one of the decorative elements and the glass, said decorative elements on opposite sides of the glass aligning to conceal at least partially said adhesive layer.

The invention therefore provides a wide latitude in the selection of adhesive means, and in general removes the requirement for there to be an optically clear or invisible adhesive interface. The adhesive means may therefore be optically imperfect, for example opaque, translucent, or contain visible defects, such as striations, bubbles or other imperfections in the adhesive interface with the glass. Such an optically imperfect adhesive means is best concealed when the decorative elements are optically non-transparent, i.e. opaque or at least translucent to some degree.

Adhesive means as viewed directly will, in general, be more noticeable than adhesive means as viewed in a reflected image, because the light will have crossed through less thickness of glass. Preferably though, the decorative elements on opposite sides of the glass align to conceal at least partially the adhesive means both as viewed directly and in the image reflected from the mirror.

There may, of course, be a slight view of adhesive means afforded through the thickness of the glass, if the decorative elements are not viewed straight on, but at a substantial angle. However, typical sheet glass is relatively thin, for example about 4 to 6 mm thick, and typical decorative elements are in most cases wider than this thickness. The decorative elements on opposite sides of the glass therefore in most cases will prevent a direct view of most of the adhesive means. In addition, when the decorative elements are non-transparent, i.e. translucent or opaque, the decorative elements will in normal lighting conditions cast a shadow between the oppositely aligned decorative elements, and this will tend to obscure or de-emphasize any slight view of the adhesive means that could be visible when the decorative unit is viewed at a substantial angle.

The minimum angle at which decorative elements may be viewed in the reflected image will in general be less shallow than what may be viewed directly. Nevertheless, it is preferable if decorative elements on opposite sides of the glass align to conceal at least partially the adhesive means in the image reflected from the mirror.

The mirror may be a conventional highly reflecting mirror formed from float glass, but could be any other reflecting surface in which an image may be seen, such as mirrored smoke coloured glass, a two way or partial mirror, or a polished metal mirror. Normally, both the mirror and the sheet of glass will be flat and parallel with each other. However, one or both of the mirror and the glass could be curved, and it is not necessary for the mirror and glass sheet to be exactly parallel.

In alternative embodiments of the invention, the mirror is concave or convex so as to respectively magnify or de-magnify said at least one decorative element spaced in front of the mirror. In particular, the de-magnifying effect can be quite striking, as this enhances the sense of depth between the decorative elements of the sheet of glass, and the image of the decorative elements visible in the mirror.

The mirror unit may be any type of portable or fixed unit, such as framed mirror suitable for mounting or hanging on a wall, a mirror in a frame adapted to be permanently set into an item of furniture such as a table top. In one application, the decorative mirror unit according to the invention may be used as part of a structure, for example a building or a conservatory, having one or more window or door apertures. At least one decorative mirror unit may then be provided within such an aperture, for example being set into a wall, door, ceiling panel or window frame.

Separating the mirror from the decorated glass surface provides a number of significant advantages. Firstly, the decoration is preferably applied to a glass surface before the glass and mirror are brought together in spaced apart relationship. This permits the use of convenient techniques in applying the decorative elements, using a template behind the glass to guide the placement of the decorative elements on the surface of the glass. Secondly, problems are encountered if the decorated glass is placed directly against the mirror, in an attempt to minimize or eliminate any gap between the glass sheet and the mirror. One of these problems is that, in practical terms, it is very difficult to get an optically satisfactory interface between a sheet of glass and another very smooth surface such as a glass or metal mirror surface. Unless index matching gel is applied between the surfaces, there may be some small layer of trapped air, for example due to dust or other imperfections, of the order of 1 $\mu$m thick, which can cause interference effects with visible fringes. This would ruin the appearance of the mirror. Another of these problems is that condensation of atmospheric moisture is bound to occur in any small gap between these smooth surfaces, which could permanently affect the transmission of light across the gap.

In most cases, it is preferred if the gap is at least 0.5 mm. This separation is sufficient so that for a mirror of average dimensions of 1 $m^2$, the glass and mirror surfaces will remain separated, even if moderate pressure is applied externally to the unit.

Larger units may require greater separations, but for most mirrors, it is preferred if the separation is no more than about 25 mm. At this separation, and taking into account any thickness of glass substrate for the mirror itself, the virtual image of the decoration produced by the mirror will be at least 50 mm behind that of the real image of the decorated glass sheet. Unless the mirror unit is particularly large, a greater separation of the real and virtual images may result in loss of usable mirror area, or a confusing and unpleasing visual effect, particularly when it is desired to see one's image in the mirror.

In a preferred embodiment of the invention, the spacer means extends fully around the periphery of the sheet of glass so that the sheet of glass and mirror form a sealed unit. The spacer means then seals the unit. This has the advantage that conventional, low cost sealing strips may be used, such as those employed in the double glazing industry and sold by Tremco Limited under the registered trade mark Swiggle Strip. These strips permit the mirror and one or more glass sheets to be bonded into a fixed, spaced apart relationship, whilst at the same time incorporating a desiccant to prevent condensation from developing in the gap between the mirror and the glass sheet, or between the glass sheets.

In another embodiment of the invention, there are two sheets of glass to which decorative elements have been applied, one sheet of glass being spaced by spacer means between the other sheet of glass and the mirror. In this way, it is possible to build up quite complicated patterns, without the need to apply multiple layers of decoration to one sheet of glass. The inner layer of glass sheet may also be provided with more delicate decorative elements, since the outer glass sheet would protect these.

The decorative mirror unit may also be adapted to present a pseudo-three-dimensional image of a recognizable object, for example a building, a person's portrait, an item of furniture, etc. This may be achieved if at least one decorative element applied on one surface of the sheet of glass presenting an image of a front surface of the recognizable object, and said at least one decorative element applied to the opposite surface of the sheet of glass presents an image of a rear surface of the same recognizable object, so that both the front and rear surfaces of the recognizable object may be viewed simultaneously in the decorative mirror unit.

One way in which the decorative elements may be applied is with the use of a template patterned with guidelines. The template cab be positioned under a horizontal sheet of clear glass, and left in place during the application of one or more decorative elements. This method of manufacture is efficient and reliable, but only works if the sheet of glass is transparent or translucent to the extent that the pattern on the template can be discerned. It would therefore not possible to use this method of fabrication with the sheet of mirrored glass to apply decorative elements directly onto the glass, because the template pattern could not be seen.

Also according to the invention, there is provided a method of fabricating a decorative mirror unit from a mirror, at least one sheet of glass having a pair of opposite plane-parallel sides, a spacer means and a plurality of decorative elements including at least one pair or optically non-transparent decorative elements, characterized in that the method comprises the steps of:

a) aligning the or each sheet of glass with respect to a template pattern visible through the glass;
b) applying with adhesive means at least one optically non-transparent decorative element to a first surface of the glass according to the template pattern;
c) applying with adhesive means at least one optically non-transparent decorative element to a second surface of the glass opposite to the first surface so that decorative elements on opposite sides of the glass align to conceal at least partially the adhesive means between at least one of the decorative elements and the glass; and d) using the spacer means to set a spacing between the or each sheet of glass and the mirror so that one of said pair of decorative elements may be viewed directly and at the same time the other of said pair of decorative elements may be viewed through the plane-parallel surfaces of the glass as a virtual image in the mirror.

When decorative elements are being applied to the said opposite surface of the sheet of glass, the decoration of the first side of the glass sheet may conveniently be used as a template. In this way, decorative elements have applied to the said opposite surface of the glass may be aligned with those on the first side to conceal at least partially the adhesive means.

The spacer means may be used not just to set the spacing, but also to seal the unit.

BRIEF DESCRIPTION OF THE DRAWINGS

The invention will now be further described, by way of example, with reference to the accompanying drawings, in which.

DETAILED DESCRIPTION

Figure 1:
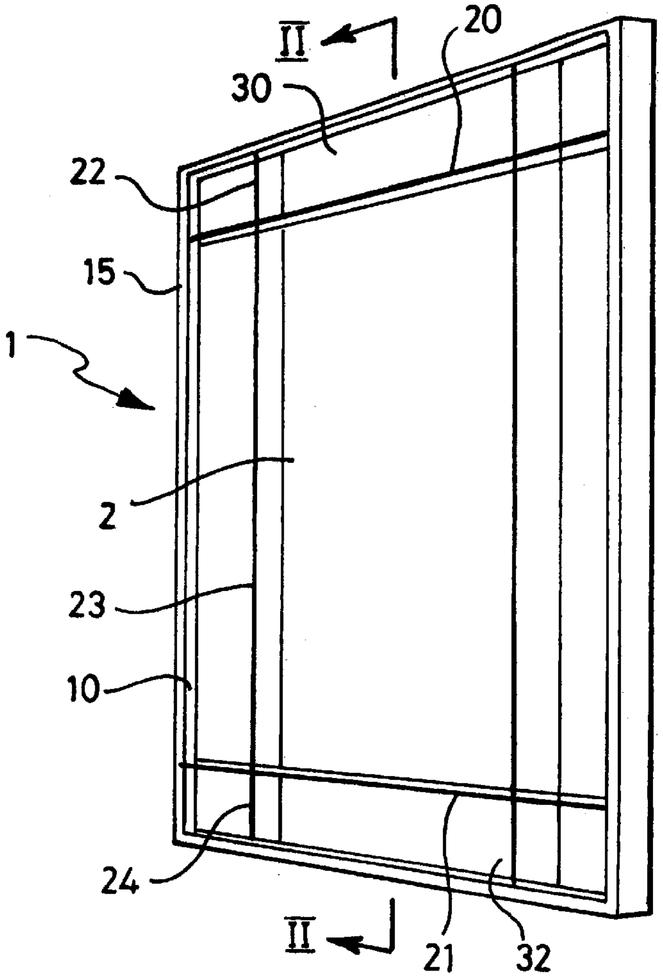
FIG. 1 is a perspective view of a decorative mirror unit in accordance with a first embodiment of the invention.
Figure 2:
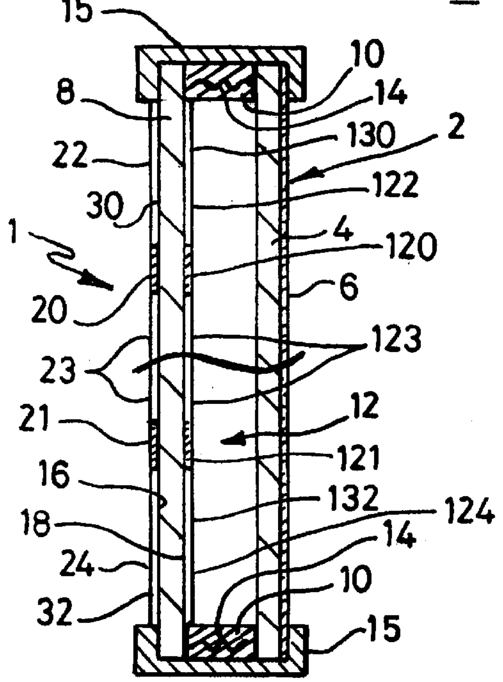
FIG. 2 is a cross section through line II—II of the decorative mirror unit of FIG. 1.
Figure 3:
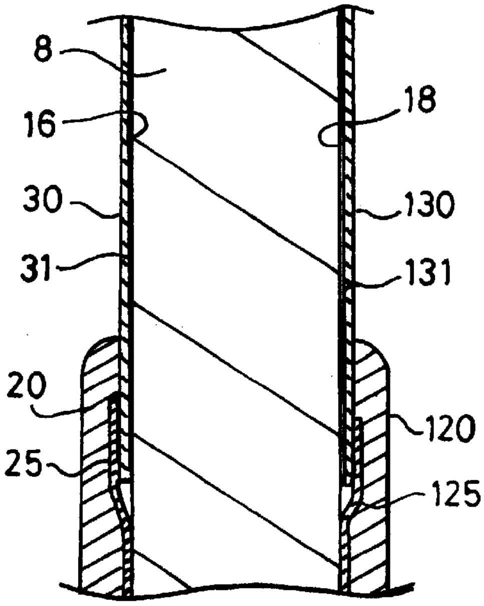
FIG. 3 is an enlarged view of part of FIG. 2.

FIGS. 1, 2 and 3 show a decorative mirror unit 1. The unit has a conventional mirror 2, made from 4 mm thick clear float glass 4 onto which an aluminium reflector layer, with protective backing, 6 has been deposited. The mirror faces towards a parallel front sheet of 4 mm thick clear float glass 8. The mirror 2 and the front glass sheet 8 are rectangular in shape, about 300 mm wide by about 400 mm tall.

A conventional Swiggle Strip (Registered Trade Mark) spacer 10 extends around the full rectangular periphery of the unit, holding and sealing the mirror 2 and front glass 8 together in a parallel spaced apart relationship. The spacer provides a 10 mm separation. The volume 12 between the mirror 2 and front glass 8 may optionally be filled with argon gas prior to sealing together the mirror 2 and front glass 8, in order to provide enhanced thermal insulation properties, for example if the unit 1 is to be used in place of an external window. The spacer 10 includes a metallic rigid element 14 and a desiccant (not shown) to help prevent any condensation within the unit 1.

Self adhesive tape 15 is wrapped around the periphery of the unit 1 to provide an additional layer of protection to the spacer 10. In use, this tape layer 15 would be hidden from view by a frame or other mount around the unit 1.

The front glass 8 has a number of decorative elements applied to both the outside 16 and inside 18 surfaces of the glass 8. Some of the elements are self-adhesive strips of metal 20–24, 120–124, each 5 mm wide and about 1 mm thick, aligned on directly opposite areas of the glass 8. The total thickness of the unit 1, including decorative strips, is therefore about 19 mm. This is compact enough so that the unit may be used in many situations, such as a frame similar to a conventional mirror frame, or a conventional window frame.

In the example illustrated, the strips divide the glass surfaces 16,18 into rectangular areas. Other elements are self-adhesive translucent coloured plastic films 30,32 adhered to the outer glass surface 16. Optionally, similar coloured plastic films 130,132 may be adhered to the inner glass surface 18, directly opposite the outer plastic films 30,32.

Each decorative element is provided with adhesive means by which the decorative elements are applied to the sheet of glass 8. As can be seen best in FIG. 3, the coloured plastic films 30,130 each have an adhesive means in the form of a tacky clear or translucent coating 31,131. Although not illustrated, the coating 31,131 before application to the glass is covered by a peel-off layer that may be removed immediately before applying the film to the glass surface 16,18.

The metal strips 20,120 also have an adhesive means 25,125 in the form of an opaque, white, foam-like, and highly sticky backing that covers nearly all of the back surface of the strips, stopping short of the exposed long edges of each strip. It should be noted that the opaque foam backing would be visually distracting from the decorative pattern if it were plainly visible.

Although not illustrated, the backing 25,125 before application to the glass is covered by a peel-off strip that may be removed immediately before applying the strip to the glass surface 16,18, in such a way to overlap edges of the decorative film 30,130.

The strip backing 25,125 provides a higher adhesion per unit area than the film coating 31,131, and therefore helps to anchor the areas of coloured plastic film 30,130 in place.

When the front of the mirror unit 1 is viewed other than perpendicularly, the mirror provides a virtual image of the decorative elements 20–24, 120–124, 30,32, as can be seen in FIG. 1. This provides a pleasing sense of depth.

Because the inner metal strips 120–124 are juxtaposed between the outer metal strips 20–24 and the mirror, separated only by the thickness of the front glass 8, the outer metal strips 20–24 effectively block most of the view of the adhesive backing holding the inner strips 120–124 to the glass inner surface 18.

The inner strips 120–124 also effectively block most of the view of the adhesive backing holding the outer strips 20–24 to the glass outer surface 16 in the image visible in the mirror 2.

Similarly because the coloured films 30,130 are applied opposite to each other, these films 30,130 effectively blocks a view, either direct or reflected, of the adhesive coating of the other coloured film 30,130.

Of course, unless the films 30,130 are opaque, it may be possible to see defects in the adhesive layer, particularly in the adhesive layer 31 of the outermost area of coloured film 30. But because the coloured films 30,130 are not totally clear, there is still some improvement in the visual appearance of the films, either viewed directly, or in the image reflected in the mirror 2.

If, however, the coloured film adhesive layer has an acceptable appearance, being free for example of visible defects such as striations, occlusions or bubbles, then it may not be necessary to have films applied to opposite areas of glass, and the film may then be applied either on just the inner or outer surfaces 16,18. In cases where it is preferred to protect the film from the environment or from scratching, the decorative film may be applied on just the inner glass surface 18, inside the sealed unit.

The unit is manufactured as follows. First, the mirror 2 and the sheet of glass 8 are cut from sheet stock to the same size, and cleaned. Then a paper template (not shown) having a pattern corresponding to the desired decoration is placed underneath the glass sheet 8, and the decorative elements 20–24, 30,32 are applied to the free surface 16 of the glass 8. Decorative elements 120–124 are then applied to the other surface 18 of the sheet of glass, directly opposite in alignment with the decorative elements on the opposite side of the glass.

The mirror 2 and the glass sheet 8 may then be bonded together, using the spacer strip 10, and with an optional fill of argon gas in the volume 12 inside the unit 1. An adhesive tape 15 is then wrapped around the peripheral sides and edges of the unit, to provide a degree of protection for the spacer 10, and also to cover over sharp exposed edges and corners of the glass 8 and mirror 2.

Finally, the unit 1 may be mounted in a frame (not shown) suitable for the use to which the mirror will be put, for example as a decorative mirror fixed in a wall, or hanging freely from a wall.

Figure 4:
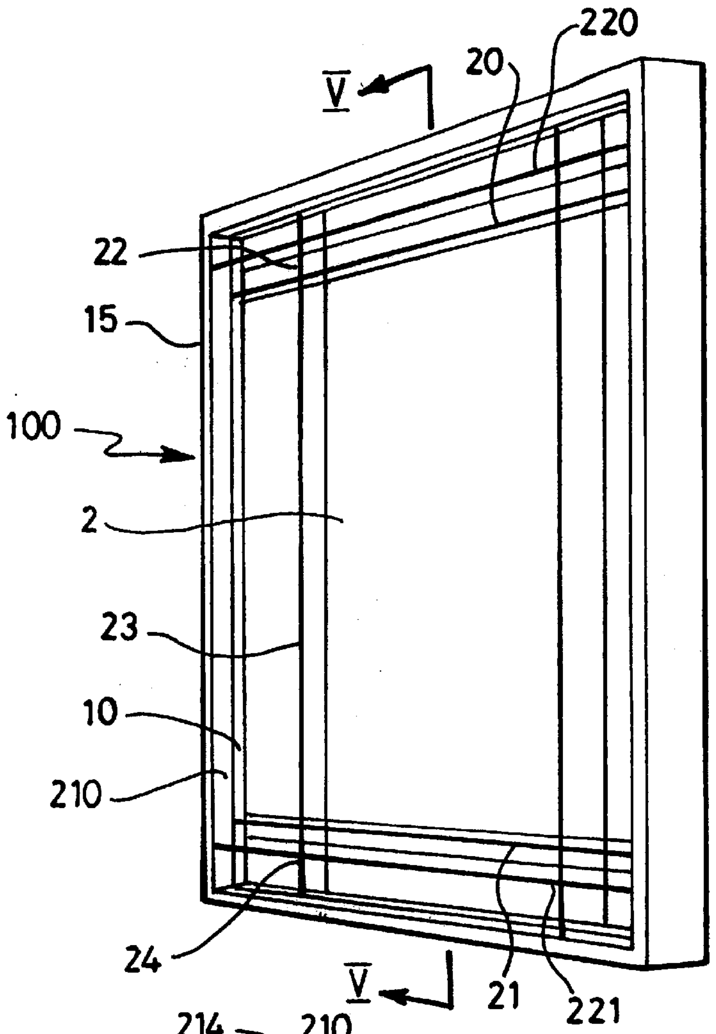
FIG. 4 is a perspective view of a decorative mirror unit in accordance with a second embodiment of the invention.
Figure 5:
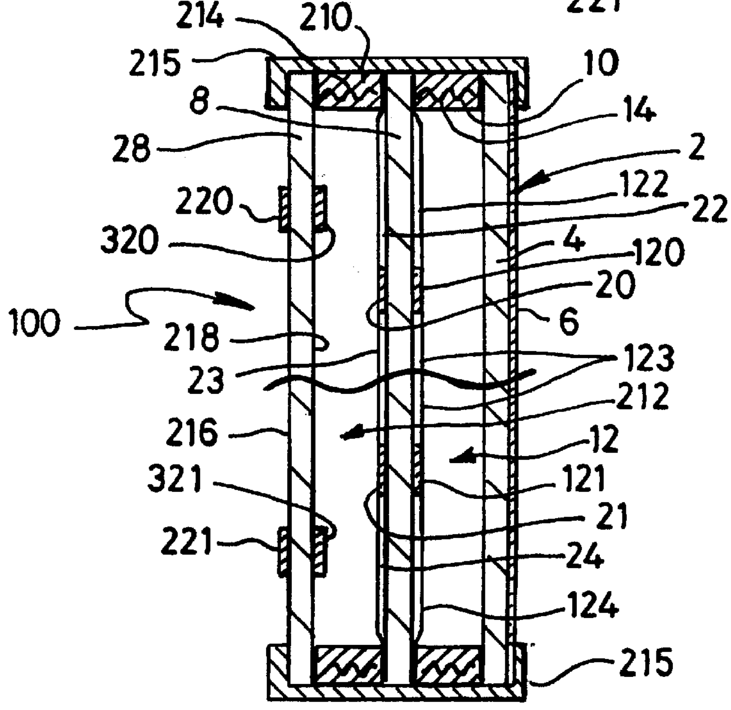
FIG. 5 is a cross section through line V—V of the decorative mirror unit of FIG. 4.

A second embodiment of a decorative unit 100 is illustrated in FIGS. 4 and 5. The unit 100 comprises all the components of the first embodiment 1 described above, for which the same reference numerals are used in the drawings. The second embodiment 100 has the addition of a second sheet of glass 28 spaced in front of the sheet of glass 8, by means of spacer element 210,214, thus enclosing a volume 212 between the inner 8 and outer 28 sheets of glass. Two decorative strip elements 220,221 are applied on the outer surface 216 of the outer glass sheet 28, and two similar strips 320,321 are applied directly opposite the outer strips 220, 221 in a similar manner to that described above. Tape 215 is then wrapped around the four edges of the decorative unit 100.

The use of the two sheets of glass 8,28 provides a greater sense of depth, particularly as the viewer will see a total of four levels of depth in the pattern, including the two sets of reflected images.

Figure 6:
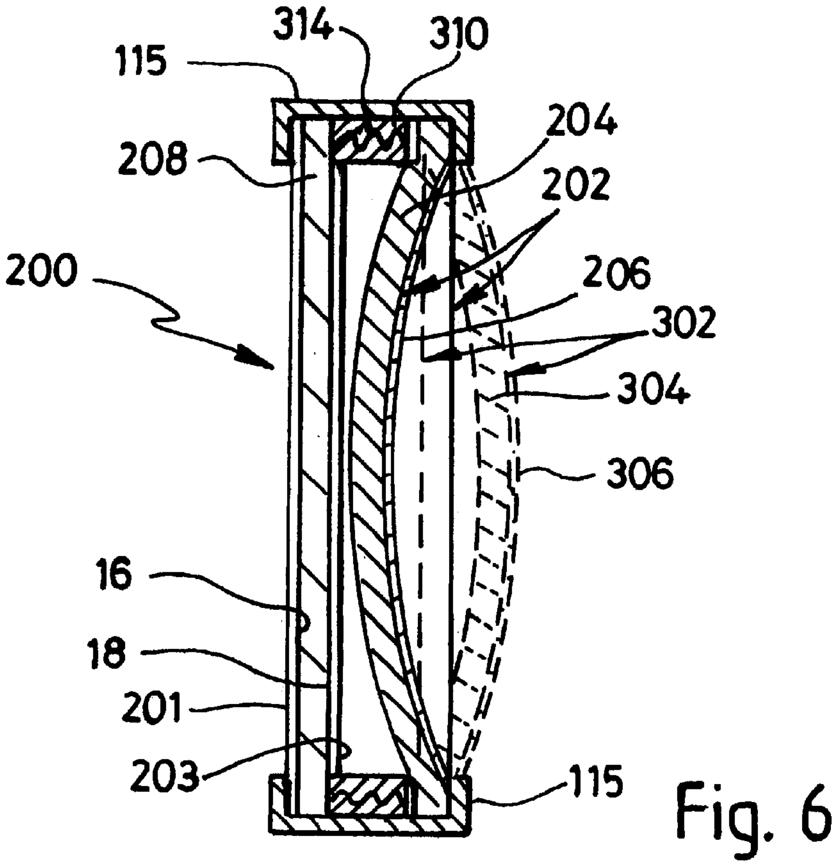
FIG. 6 is a cross section through a decorative mirror unit in accordance with a third embodiment of the invention.

A third embodiment 200 is illustrated in FIG. 6. Here the decorative unit has one circular sheet of glass 208 to which decorative elements 201,203 have been applied on directly opposite areas of the glass 208. A peripheral circular Swiggle Strip (trade mark) spacer element 310,314 holds the glass 208 in a fixed spaced apart relationship with a circular mirror, which may be a convex mirror 202. In an alternative variant, the mirror may be a concave mirror 302, drawn in FIG. 6 in phantom. In each case, the mirror 202,302 is formed from 4 mm thick glass 204,304 with a conventional aluminium reflector with an outer protective layer 206,306. The assembly is then held together with tape 115 wrapped around the circular periphery of the decorative unit 200.

The effect of the convex and concave mirrors 202,203 is respectively to demagnify or magnify the image of the decorative elements 201,203 as viewed in the mirror.

The decorative mirror unit may be made in a wide range of shapes or sizes, and have multiple decorated sheets of glass spaced from the mirror, depending on the use for which the mirror is intended. The spacing of the sheet or sheets from the mirror may be chosen to achieve the desired effect of depth. A curved mirror may be used to provide interesting optical effects. The seal between the glass and mirror helps to keep the mirror surface inside the unit clean and free from condensation, and also protects more delicate decorative elements inside the mirror from damage or wear. The use of decorative elements applied on directly opposite portions of the glass makes it easier to hide any optical imperfections or distractions stemming from the adhesive layers. The continuous sheets of glass held together by the spacer have a strength far in excess of traditionally leaded glass, and together are also more robust and secure than a single sheet of comparable mirror glass.

Figure 7:
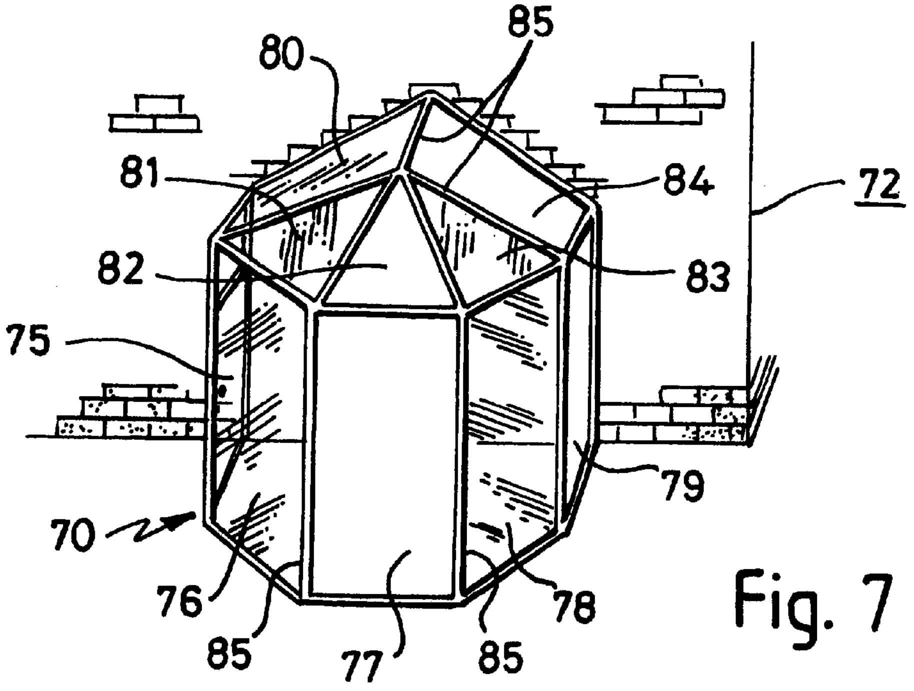
FIG. 7 is a perspective view of a structure incorporating a number of decorative mirror units in place of conventional exterior glass panels.

FIG. 7 shows how a decorative unit according to the invention may form part of a structure, for example a house, office, or shop, being held in a window or door aperture, either internally or externally. In the particular example illustrated, the structure is a conservatory 70, which may be an extension to a house 72. Such conservatories commonly have external wall surfaces such as a door 75, walls 76–79 and a ceiling 80–84 that are made predominantly from double glazed glass panels held together within apertures defined by a framework 85. Decorative units according to the invention may be used economically as a direct replacement to such glass panels. In the illustrated example, panels 77,79,82 and 84 have been replaced with such decorative units, with the decorative unit being arranged to face inside. In order to provide environmental protection from the elements it will in general be necessary to provide a protective coating on the side of the decorative panels facing outside.

This provides a number of significant benefits. First, the decorative unit may be located so as to block an otherwise unappealing view. Second, the decorative unit will have superior insulating properties on account of the radiant heat reflected back into the structure from the mirror reflector layer. Third, the decorative unit may provide colour and decoration in a predominantly glass structure which is otherwise not easy to decorate. Fourth, because the mirror may be completely opaque, the decorative unit may be positioned so as to limit the amount of sunlight that would enter the structure in the summer months, thereby keeping the structure cooler in the summer. Fifth, the use of decorative reflective panels in a relatively small structure as a conservatory, can provide an impression of increased space.

It is to be recognized that various alterations, modifications, and/or additions may be introduced into the constructions and arrangements of parts described above without departing from the spirit or ambit of the present invention.

What is claimed is:

1. A decorative mirror unit, comprising a mirror and at least one sheet of glass spaced in front of the mirror by spacer means, and a plurality of decorative elements applied to the glass by an adhesive means, characterized in that said sheet of glass has a pair of opposite plane-parallel surfaces and at least one optically non-transparent decorative element has been applied to each surface on opposite sides of the glass by said adhesive means, said decorative elements on opposite sides of the glass aligning to conceal at least partially the adhesive means between at least one of the decorative elements and the glass, wherein said plane-parallel surfaces extend away from a pair of said aligned optically non-transparent decorative elements on opposite sides of the glass so that a viewer can see one of said pair of decorative elements directly, and at the same time view through the plane-parallel surfaces a virtual image in the mirror of the other of said pair of decorative elements.

2. A decorative mirror unit as claimed in claim 1, in which the adhesive means comprises an adhesive interface between at least one of the decorative elements and the glass, said decorative elements on opposite sides of the glass aligning to conceal at least partially said adhesive interface.

3. A decorative mirror unit as claimed in claim 1, in which the adhesive means comprises an adhesive layer between at least one of the decorative elements and the glass, said decorative elements on opposite sides of the glass aligning to conceal at least partially said adhesive layer.

4. A decorative mirror unit as claimed in claim 1, in which the decorative elements on opposite sides of the glass align to conceal at least partially the adhesive means both as viewed directly and in the image reflected from the mirror.

5. A decorative mirror unit as claimed in claim 1, in which the spacer means extends fully around the periphery of the sheet of glass so that the sheet of glass and mirror form a sealed unit.

6. A decorative mirror unit as claimed in claim 1, in which there are two sheets of glass to which decorative elements have been applied, one sheet of glass being spaced by spacer means between the other sheet of glass and the mirror.

7. A decorative mirror unit as claimed in claim 1, in which the mirror is concave or convex so as to respectively magnify or de-magnify said at least one decorative element applied on one surface of the sheet of glass spaced in front of the mirror.

8. A decorative mirror unit as claimed in claim 1, in which said at least one decorative element applied on one surface of the sheet of glass presents an image of a front surface of a recognizable object, and said at least one decorative element applied to the opposite surface of the sheet of glass presents an image of a rear surface of the same recognizable object, so that both the front and rear surfaces of the recognizable object may be viewed simultaneously in the decorative mirror unit.

9. A structure comprising one or more window or door apertures, in which there is at least one decorative mirror unit within an aperture, said decorative mirror unit comprising a mirror and at least one sheet of glass spaced in front of the mirror by spacer means, and a plurality of decorative elements applied to the glass by an adhesive means, characterized in that said sheet of glass has a pair of opposite plane-parallel surfaces and at least one optically non-transparent decorative element has been applied to each surface on opposite sides of the glass by said adhesive means, said decorative elements on opposite sides of the glass aligning to conceal at least partially the adhesive means between at least one of the decorative elements and the glass, wherein said plane-parallel surfaces extend away from a pair of said aligned optically non-transparent decorative elements on opposite sides of the glass so that a viewer can see one of said pair of decorative elements directly, and at the same time view through the plane-parallel surfaces a virtual image in the mirror of the other of said pair of decorative elements.

10. A structure as claimed in claim 9, in which the aperture is in an external surface of the structure, the decorative unit being arranged to face inside and having on the side facing outside a protective coating on the rear surface of the mirror to provide protection for the mirror from the elements.

11. A method of fabricating a decorative mirror unit from a mirror, at least one sheet of glass having a pair of opposite plane-parallel sides, a spacer means and a plurality of decorative elements including at least one pair of optically non-transparent decorative elements, characterized in that the method comprises the steps of:

a) aligning the or each sheet of glass with respect to a template pattern visible through the glass;

b) applying with adhesive means at least one optically non-transparent decorative element to a first surface of the glass according to the template pattern;

c) applying with adhesive means at least one optically non-transparent decorative element to a second surface of the glass opposite to the first surface so that decorative elements on opposite sides of the glass align to conceal at least partially the adhesive means between at least one of the decorative elements and the glass, said plane-parallel surfaces extending away from said aligned pair of decorative elements; and d) using the spacer means to set a spacing between the or each sheet of glass and the mirror so that one of said pair of decorative elements may be viewed directly and at the same time the other of said pair of decorative elements may be viewed through the plane-parallel surfaces of the glass as a virtual image in the mirror.

12. A method of fabricating a decorative mirror unit, as claimed in claim 11, in which step d) includes the step of:

e) using the spacer means to seal the unit.

13. A method of fabricating a decorative mirror unit, as claimed in claim 11, in which steps b) and c) comprise the step of:

f) applying decorative elements to the opposite surfaces of the glass in such a way as to conceal at least partially the adhesive means both as viewed directly and in the image reflected from the mirror.

14. A method of fabricating a decorative mirror unit, as claimed in claim 11, in which there are two sheets of glass, comprising the step of:

g) using spacer means to space one sheet of glass between the other sheet of glass and the mirror.

* * * * *